(12) United States Patent
Ashihara et al.

(10) Patent No.: US 9,657,769 B2
(45) Date of Patent: May 23, 2017

(54) SLIDE BEARING

(71) Applicants: TAIHO KOGYO CO., LTD., Toyota-shi, Aichi (JP); TOYOTA JIDOSHA KABUSHIKI KAISHA, Toyota-shi, Aichi (JP)

(72) Inventors: Katsuhiro Ashihara, Toyota (JP); Yuichiro Kajiki, Toyota (JP); Hiroki Takata, Toyota (JP); Akihiro Honda, Susono (JP); Motoichi Murakami, Gotemba (JP)

(73) Assignees: TAIHO KOGYO CO., LTD., Toyota-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/778,419

(22) PCT Filed: Mar. 19, 2014

(86) PCT No.: PCT/JP2014/057594
§ 371 (c)(1),
(2) Date: Sep. 18, 2015

(87) PCT Pub. No.: WO2014/148573
PCT Pub. Date: Sep. 25, 2014

(65) Prior Publication Data
US 2016/0195127 A1 Jul. 7, 2016

(30) Foreign Application Priority Data
Mar. 21, 2013 (JP) ................................ 2013-058660

(51) Int. Cl.
*F16C 33/10* (2006.01)
*F16C 9/02* (2006.01)
*F16C 17/02* (2006.01)

(52) U.S. Cl.
CPC .............. *F16C 9/02* (2013.01); *F16C 17/022* (2013.01); *F16C 33/107* (2013.01); *F16C 33/1025* (2013.01)

(58) Field of Classification Search
CPC ...... F16C 9/02; F16C 17/022; F16C 33/1065; F16C 33/1025; F16C 33/107
See application file for complete search history.

(56) References Cited

U.S. PATENT DOCUMENTS 1,121,904 A * 12/1914 Doehler .............. F16C 33/1065
384/162
1,940,301 A * 12/1933 Grobel .................. F16C 33/106
384/291

(Continued)

FOREIGN PATENT DOCUMENTS

DE           1525266 A1    9/1969
DE      102011005467 A1    9/2012

(Continued)

OTHER PUBLICATIONS

Extended European Search Report dated Feb. 16, 2016, in European Application No. 14770891.1-1751.

*Primary Examiner* — Alan B Waits
(74) *Attorney, Agent, or Firm* — Andrews Kurth Kenyon LLP

(57) ABSTRACT

Provided is a slide bearing with which friction-reducing effects are obtained and the total volume of effluent oil is limited. In a slide bearing an end of the narrow groove on a downstream side of the rotation direction is disposed at the position which is adjacent to a mating surface on the downstream side of the rotation direction and not communicated with the mating surface on the downstream side of the rotation direction and an end of the narrow groove on an upstream side of the rotation direction is disposed at the position which is the upstream side from the end on the (Continued)

downstream side of the rotation direction and is rotated by an angle no more than 90 degrees from the mating surface on the downstream side of the rotation direction.

2 Claims, 5 Drawing Sheets

(56) References Cited

U.S. PATENT DOCUMENTS

| | | | | |
|---|---|---|---|---|
| 3,386,783 | A * | 6/1968 | Scheufler | F16C 17/02 384/291 |
| 4,105,267 | A * | 8/1978 | Mori | F16C 33/1065 384/291 |
| 4,856,366 | A * | 8/1989 | Nikolaus | F16C 3/14 384/291 |
| 6,082,904 | A | 7/2000 | Ono et al. | |
| 6,241,394 | B1 * | 6/2001 | Kallenberger | E02F 3/58 384/291 |
| 8,783,954 | B2 * | 7/2014 | Garnier | F16C 9/02 384/286 |
| 8,821,023 | B2 * | 9/2014 | Bresser | F16C 33/10 384/288 |
| 8,979,378 | B2 * | 3/2015 | Hikita | F16C 9/02 384/288 |
| 2004/0062458 | A1 * | 4/2004 | Mian | F16C 9/02 384/294 |
| 2005/0201647 | A1 * | 9/2005 | Kuroda | F16C 9/02 384/291 |
| 2009/0257695 | A1 * | 10/2009 | Ukai | F16C 9/02 384/397 |
| 2010/0119182 | A1 * | 5/2010 | Sugimoto | F16C 9/02 384/397 |
| 2011/0058761 | A1 * | 3/2011 | Ishigo | F16C 9/02 384/288 |
| 2012/0294558 | A1 * | 11/2012 | Ovares | F16C 9/02 384/288 |
| 2013/0343682 | A1 * | 12/2013 | Garnier | F16C 9/02 384/322 |
| 2014/0169712 | A1 * | 6/2014 | Suzuki | F16C 33/6681 384/289 |
| 2014/0248012 | A1 | 9/2014 | Hikita et al. | |

FOREIGN PATENT DOCUMENTS

| | | |
|---|---|---|
| GB | 1144131 A | 3/1969 |
| JP | H03-48017 A | 3/1991 |
| JP | H06-346913 A | 12/1994 |
| JP | H08-121459 A | 5/1996 |
| JP | 2003-532036 A | 10/2003 |
| JP | 2011-089563 A | 5/2011 |
| JP | 2013-194830 A | 9/2013 |

* cited by examiner

Fig.3(a) With grooves that don't communicate with matching surface
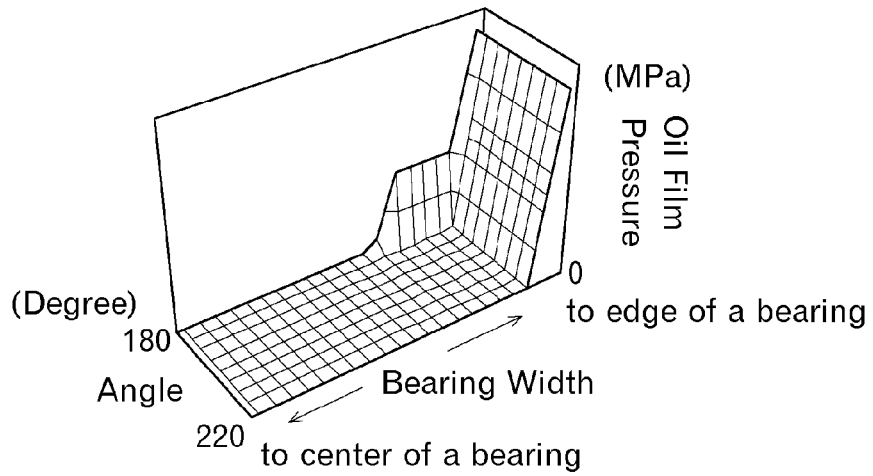
Fig.3(b) Without a groove
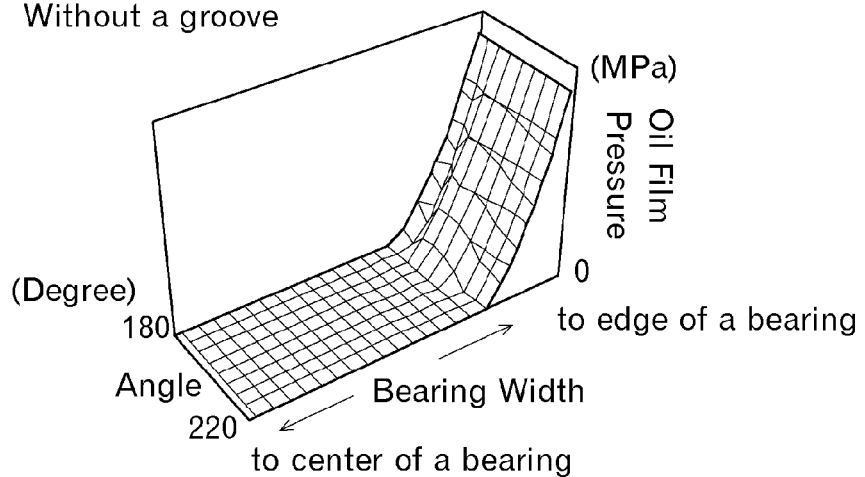
Fig.3(c) With grooves that communicate with matching surface
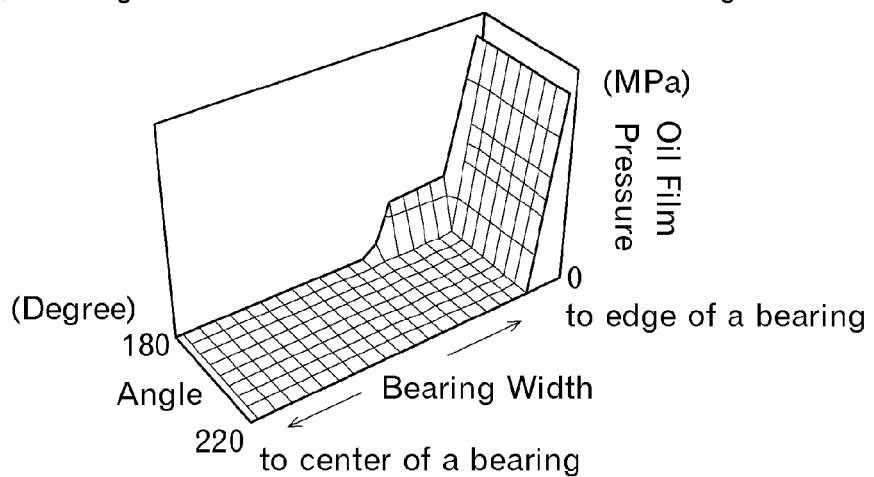

SLIDE BEARING

CROSS-REFERENCE TO RELATED APPLICATIONS

This is a national phase application based on the PCT International Patent Application No. PCT/JP2014/057594 filed Mar. 19, 2014, claiming priority to Japanese Patent Application No. 2013-058660 filed Mar. 21, 2013, the entire contents of both of which are incorporated herein by reference.

TECHNICAL FIELD

The present invention relates to a slide bearing. In detail, the present invention relates to a slide bearing having vertically disposed halved members which is made by dividing a cylinder in two in a direction parallel to the axial direction.

BACKGROUND ART

Conventionally, a slide bearing for holding a crankshaft of an engine rotatably that has halved structure in which two members divided in two are mated is known. In order to reduce the frictional area of the bearing and to get friction-reducing effect, the width of the bearing is reduced. However, reducing the width of the bearing causes increase of volume of effluent oil. Then, it is publicly known that relief parts (narrow grooves) all over the circumference are configured at the both ends of the bearing in the axial direction (Patent Literature 1).

PRIOR ART REFERENCE

Patent Literature

Patent Literature 1: the Japanese Translation of PCT International Application Publication No. 2003-532036

DISCLOSURE OF INVENTION

Problems to be Solved by the Invention

However, in the conventional bearing in which narrow grooves all over the circumference are configured, reducing a friction area causes decrease of the load carrying capacity and the oil film thickness which is necessary for good lubrication is not able to be kept and also the total volume of effluent oil is much.

In consideration of the above problems, the present invention provides a slide bearing for getting friction-reducing effect and to suppress total volume of effluent oil.

Means for Solving the Problems

Problems to be solved by the invention are described as above and the means for solving the problems is explained.

According to the invention of claim 1, in a slide bearing in which halved members made by dividing a cylinder in two in a direction parallel to the axial direction are disposed vertically, narrow grooves are provided at an end of the lower halved member in the circumferential direction, an end of the narrow groove on a downstream side of the rotation direction is disposed at the position which is adjacent to a mating surface on the downstream side of the rotation direction and not communicated with the mating surface on the downstream side of the rotation direction, and an end of the narrow groove on an upstream side of the rotation direction is disposed at the position which is the upstream side from the end of the narrow groove on the downstream side of the rotation direction and is rotated by an angle no more than 90 degrees from the mating surface on the downstream side of the rotation direction.

According to the invention of claim 2, the end of the narrow groove on the upstream side of the rotation direction is disposed at the position which is rotated to the upstream side by an angle no less than 45 degrees from the mating surface on the downstream side of the rotation direction.

Effect of the Invention

As effects of the invention, the effects shown as below are caused.

Namely, by providing the narrow grooves which do not prevent the generation of the oil film pressure, the friction-reducing effect is obtained with reducing the frictional area and the total volume of effluent oil is reduced.

By not communicating the end of the narrow groove on the downstream side of the rotation direction with the mating surface, the burr is not adhered when the narrow groove is processed and the process becomes easy. By not communicating the end of the narrow groove on the downstream side of the rotation direction with the mating surface, the reduction of the oil pressure nearby the mating surface on the downstream side of the rotation direction is relieved, in case that the mating surface of the lower halved member on the downstream side and the mating surface of the lower halved member on the upstream side is disposed in reverse positions, the oil pressure is at least able to be kept.

BRIEF DESCRIPTION OF DRAWINGS

FIG. 3(a) is three-dimensional graph which shows gradient of oil film pressure of the slide bearing with narrow grooves according to this embodiment (as calculated value), FIG. 3(b) is three-dimensional graph which shows gradient of oil film pressure of the slide bearing without narrow groove (as calculated value), and FIG. 3(c) is three-dimensional graph which shows gradient of oil film pressure of the slide bearing with narrow groove according to comparative example (as calculated value).

DETAILED DESCRIPTION OF THE INVENTION

Figure 1:
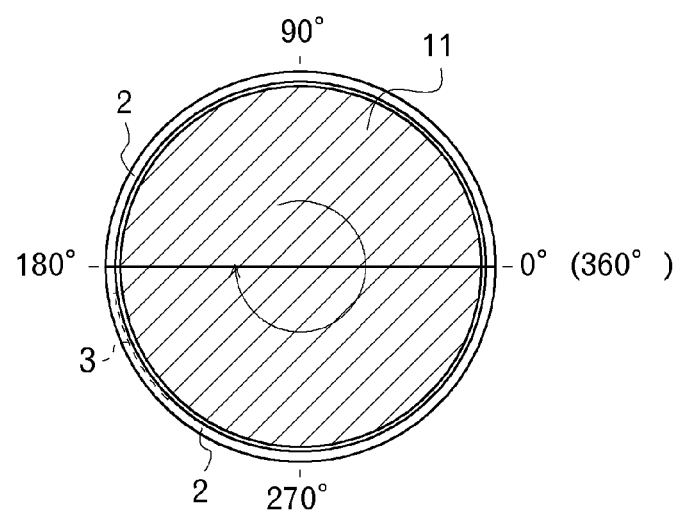
FIG. 1 is a front view of a slide bearing according to this embodiment.

An embodiment of the invention is explained. The FIG. 1 is the front view of the slide bearing 1 and the up and down direction on the drawing is defined as the up and down direction and the near and far direction on the drawing is defined as the axial direction (the front and back direction).

Firstly, the halved members 2 which configure the slide bearing 1 concerning the first embodiment are explained with the FIG. 1 and the FIG. 2.

The slide bearing 1 is cylindrical member and it is adopted to the slide bearing structure of the crankshaft 11 of the engine as shown in the FIG. 1. The slide bearing 1 is configured by the two halved members 2, 2. The halved members 2, 2 have the shapes in which the cylinder has been divided in two in the direction parallel to the axial direction and are shaped as semicircle shape on the cross-section view. In the embodiment, the halved members 2, 2 are disposed in the top and the bottom and the mating surfaces are shaped at the right and the left. In the case that the crankshaft 11 is held by the slide bearing 1, the clearance gap is configured and lubricating oil is supplied from oil route which is not shown toward the clearance gap.

Figure 2A:
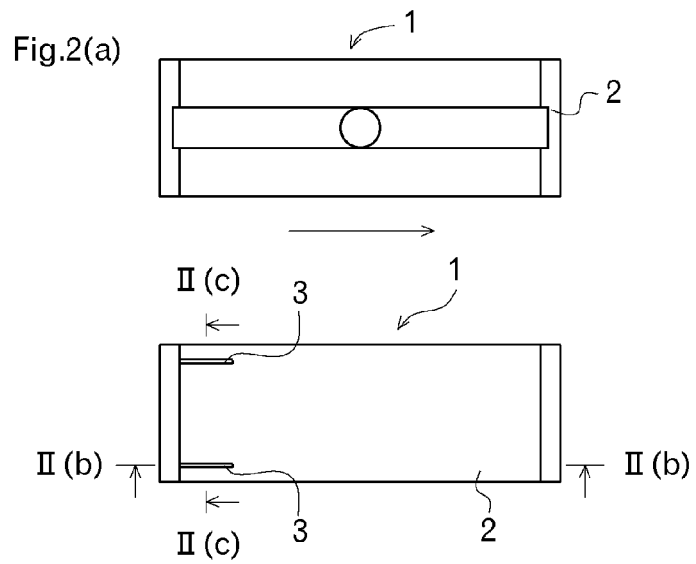
FIG. 2(a) is a plan view of a halved member of the slide bearing according to this embodiment.
Figure 2B:
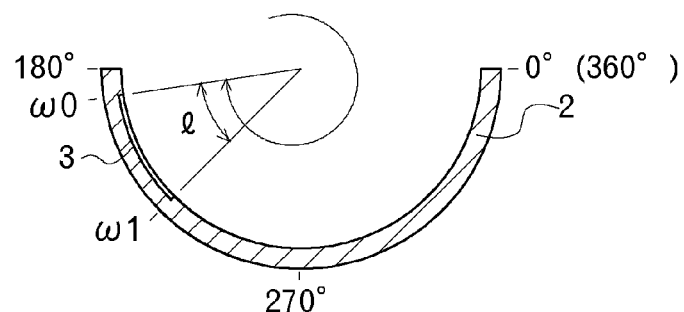
FIG. 2(b) is a A-A line sectional view.

In the FIG. 2(a), upper and lower halved members 2 are shown. In the embodiment, the rotation direction of the crankshaft 11 is clockwise direction on the front view as the vector shown in the FIG. 1. In the bearing angle ω, the right edge in the FIG. 2(b) is defined as 0 degree and the counter clockwise direction shown in the FIG. 2(b) is positive direction. Thus, in the FIG. 2(b), the bearing angle ω at the left edge is defined as 180 degrees and the bearing angle ω at the down edge is defined as 270 degrees.

A groove is provided in the circumferential direction at the inner circumference of the upper halved member 2 and the circle hole is provided at the center. The mating surfaces are disposed at the right and left side of the upper halved member 2.

In the slide surface of the inner circumference of the lower halved member 2, narrow grooves 3 are configured at the edge in the axial direction.

The narrow grooves 3 are provided at the lower halved member 2. In the embodiment, the narrow grooves 3 are provided as two lines parallel to the axial direction. The end of the narrow grooves 3 on the downstream side of the rotation direction is provided to be adjacent to the mating surface on the downstream side of the rotation direction of the crankshaft 11 and not to be communicated with the mating surface on the downstream side of the rotation direction.

In detail, the end of the narrow grooves 3 on the downstream side of the rotation direction of the crankshaft 11 are disposed at the bearing angle ω0 which is bigger than 180 degrees where the mating surface on the downstream side of the rotation direction is located. Thus, the narrow groove 3 is provided from the bearing angle ω which is bigger than the angle of the mating surface on the downstream side of the rotation direction (the bearing angle is 180 degrees) toward the direction in which the bearing angle ω is positive number (the counter clockwise direction) on the circumferential direction.

Thus, in the lower halved member 2, the mating surface on the right side in the FIG. 2(b) is the mating surface on the upstream side of the rotation direction and the mating surface on the left side in the FIG. 2(b) is the mating surface on the downstream side in the rotation direction.

The length l of the narrow groove 3 is configured as the length from the end of the narrow grooves 3 (the bearing angle is ω0) on the downstream side of the rotation direction to the end of the narrow grooves 3 (the bearing angle is ω1) on the upstream side of the rotation direction. Furthermore, the bearing angle ω1 is more than ω0 and not more than 270 degrees. More detailed, the bearing angle ω1 is usually the range of 225 degrees to 270 degrees.

Figure 2C:
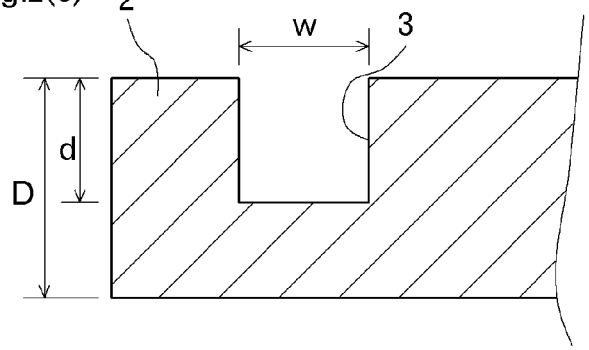
FIG. 2(c) is a B-B line sectional view.

As shown in the FIG. 2(c), the narrow groove 3 is configured as the depth d is shallower than the bearing thickness D. The width of the narrow groove 3 is configured as w.

The narrow groove 3 is provided by machining the inner circumferential surface of the halved member 2. Then, the burr is not produced because of not communicating the end on the downstream side of the rotation direction with the mating surface on the downstream side of the rotation direction. Thus, in the case of providing the narrow groove 3 in such a way as to communicate the end on the downstream side of the rotation direction with the mating surface on the downstream side of the rotation direction, the burr is adhered around the end of the narrow groove 3 on the downstream side of the rotation direction and it is necessary to remove the burr. By not communicating the end on the downstream side of the rotation direction with the mating surface on the downstream side of the rotation direction, the burr is not adhered and it is not necessary to remove the burr.

Next, the oil film pressure gradient of slide bearing 1 with the narrow groove 3 is explained with the FIG. 3.

By providing the narrow groove 3 at the edge of the halved member 2 in the axial direction, as shown in the FIG. 3(a), the oil film pressure gradient at the edge of the halved member 2 in the axial direction is able to be changed. Thus, in the case of not providing the narrow groove 3 as shown in the FIG. 3(b), with increasing the pressure gradient which descends from the edge of the bearing to the center of the bearing, the suck back volume of the oil increases and the total volume of effluent oil can be reduced.

The slide bearing 101 to compare with the embodiment is shown in the FIG. 4.

Figure 4A:
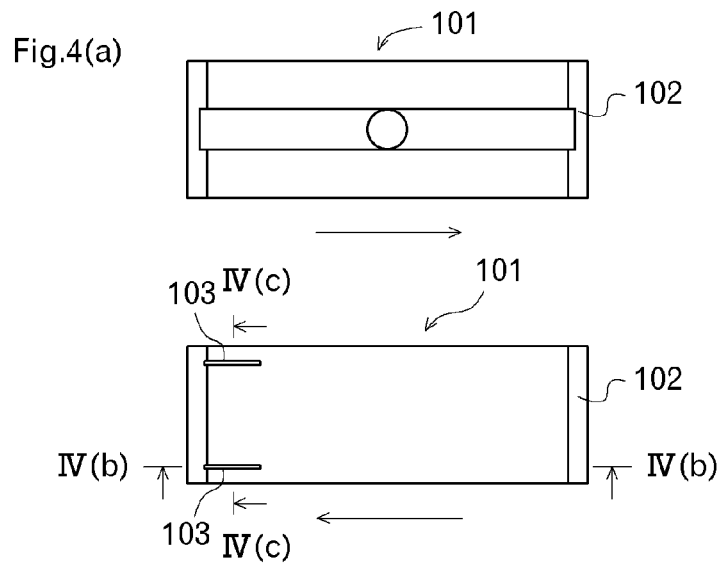
FIG. 4(a) is a plan view of a halved member of the slide bearing with narrow grooves which is communicated with the mating surface on the downstream side of the rotation direction.
Figure 4B:
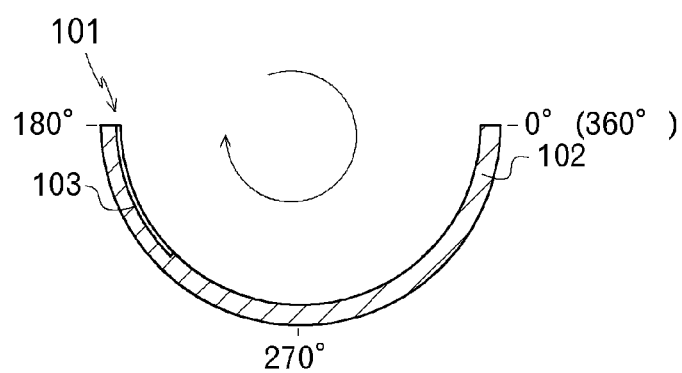
FIG. 4(b) is a C-C line sectional view.
Figure 4C:
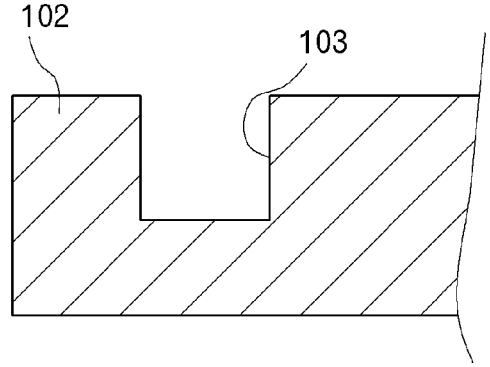
FIG. 4(c) is a D-D line sectional view.

As shown in the FIG. 4(a) to (c), the slide bearing 101 for comparison is configured two halved members 102, 102. Thus, the upper halved member 102 has the same configuration as the halved member 2 according to this embodiment and the illustration is omitted.

As shown in the FIGS. 4(a) and (b), in the slide surface of the inner circumference of the lower halved member 102, the narrow grooves 103 are configured at the edge in the axial direction.

As shown in the FIG. 4(b), the end of the narrow grooves 103 on the downstream side of the rotation direction is provided to be communicated with the mating surface of the crankshaft 11 on the downstream side of the rotation direction. The oil film pressure gradient of slide bearing 101 for comparison as described above is shown in the FIG. 3(c).

To compare with the FIG. 3(a) and the FIG. 3(c), in the slide bearing 1 according to this embodiment, the oil pressure nearby the mating surface on the downstream side of the rotation direction is higher compared to the oil pressure gradient of the slide bearing 101 for comparison.

Figure 5:
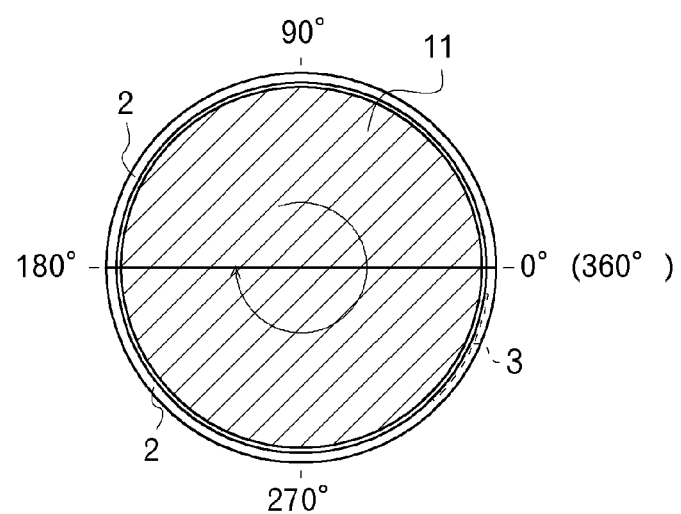
FIG. 5 is a plan view of a slide bearing in case a lower halved member is disposed in reverse positions.

Thus, as shown in the FIG. 5, in case that the lower halved member 2 is disposed to the upper halved member 2 in reverse positions, the oil pressure is at least able to be kept and the oil film thickness which is necessary for good lubrication of the slide bearing 1 is able to be kept.

As stated above, the slide bearing 1 in which halved members 2, 2 made by dividing a cylinder in two in a direction parallel to the axial direction are disposed vertically, narrow grooves 3 are provided at an end of the lower halved member 2 in the circumferential direction, an end of the narrow groove 3 on a downstream side of the rotation direction is disposed at the position which is adjacent to a mating surface on the downstream side of the rotation direction and not communicated with the mating surface on the downstream side of the rotation direction, and an end of the narrow groove 3 on an upstream side of the rotation direction is disposed at the position which is the upstream side from the end of the narrow groove 3 on the downstream side of the rotation direction and is rotated by an angle no more than 90 degrees from the mating surface on the downstream side of the rotation direction.

Then, the bearing angle $\omega$ at the mating surface on the downstream side of the rotation direction is 180 degrees and the bearing angle $\omega 1$ of the end on the upstream side of the rotation direction is more than $\omega 0$ and not more than 270 degrees and $\omega 0$ is more than 180 degrees.

By this structure, with providing the narrow grooves which do not prevent the generation of the oil film pressure, the friction-reducing effect is obtained while reducing the frictional area and the total volume of effluent oil is reduced.

By not communicating the end of the narrow groove 3 on the downstream side of the rotation direction with the mating surface, the burr is not adhered when the narrow groove 3 is processed and the process becomes easy. By not communicating the end of the narrow groove 3 on the downstream side of the rotation direction with the mating surface, the reduction of the oil pressure nearby the mating surface on the downstream side of the rotation direction is relieved, in case that the mating surface of the lower halved member 2 on the downstream side and the mating surface of the lower halved member 2 on the upstream side is disposed in reverse positions, and the oil pressure is at least able to be kept.

INDUSTRIAL APPLICABILITY

The present invention is acceptable to the skill of the slide bearing and acceptable to the slide bearing in which halved members made by dividing a cylinder in two in a direction parallel to the axial are disposed vertically.

DESCRIPTION OF NOTATIONS

1 slide bearing
2 halved member
3 narrow groove
11 crankshaft

The invention claimed is:

1. A slide bearing in which halved members made by dividing a cylinder in two in a direction parallel to the axial direction are disposed vertically,
   wherein a first groove is provided at the inner circumference of the upper halved member,
   wherein second grooves which are narrower than the first groove are provided at an end of the lower halved member in the circumferential direction,
   wherein an end of each of the second grooves on a downstream side of the rotation direction is disposed at the position which is adjacent to a mating surface on the downstream side of the rotation direction,
   wherein an end of each of the second grooves on an upstream side of the rotation direction is disposed at the position which is the upstream side from the ends of the second grooves on the downstream side of the rotation direction and is rotated by an angle no more than 90 degrees from the mating surface on the downstream side of the rotation direction, and
   wherein neither of the ends of the second grooves are communicated with the mating surfaces of the slide bearing.

2. The slide bearing according to claim 1 wherein the end of each of the second grooves on the upstream side of the rotation direction is disposed at the position which is rotated to the upstream side by an angle no less than 45 degrees from the mating surface on the downstream side of the rotation direction.

* * * * *

UNITED STATES PATENT AND TRADEMARK OFFICE
CERTIFICATE OF CORRECTION

PATENT NO. : 9,657,769 B2
APPLICATION NO. : 14/778419
DATED : May 23, 2017
INVENTOR(S) : Katsuhiro Ashihara et al.

Page 1 of 1

It is certified that error appears in the above-identified patent and that said Letters Patent is hereby corrected as shown below:

In the Specification

At Column 3, Line 52, change the content from:
"angle co is positive number"
To:
"angle $\omega$ is positive number"

At Column 3, Line 66, change the content from:
"angle col is usually the range of"
To:
"angle $\omega 1$ is usually the range of"

Signed and Sealed this
Twenty-second Day of May, 2018

Andrei Iancu
*Director of the United States Patent and Trademark Office*